United States Patent [19]

Pageaud et al.

[11] Patent Number: 5,018,046
[45] Date of Patent: May 21, 1991

[54] FILM CAPACITOR CAPABLE OF UNDERGOING SEVERE ELECTRICAL TREATMENT AND METHODS FOR THE FABRICATION OF SUCH A CAPACITOR

[75] Inventors: Michel Pageaud; Robert Gillet, both of Seurre, France

[73] Assignee: Compagnie Europeenne de Composants Electroniques LCC, Courbevoie, France

[21] Appl. No.: 451,522

[22] Filed: Dec. 15, 1989

[30] Foreign Application Priority Data

Dec. 20, 1988 [FR] France ............................. 88 16815

[51] Int. Cl.$^5$ ..................... H01G 4/24; H01G 1/13; H01G 7/00
[52] U.S. Cl. .................................. 361/273; 361/308; 29/25.42
[58] Field of Search ............... 29/25.42; 361/303, 305, 361/273, 308, 310, 323, 324

[56] References Cited

U.S. PATENT DOCUMENTS 2,171,127  8/1939  Kohman ........................... 29/25.42
2,585,752  2/1952  Dorst ................................. 29/25.42

FOREIGN PATENT DOCUMENTS 0032738  7/1981  European Pat. Off. .
1385588  12/1964  France .
2547105  12/1984  France .
971117  9/1964  United Kingdom ............... 29/25.42
2084799  4/1982  United Kingdom .

Primary Examiner—Donald A. Griffin
Attorney, Agent, or Firm—Oblon, Spivak, McClelland, Maier & Neustadt

[57] ABSTRACT

The disclosure concerns the fabrication of film capacitors of the stacked or coiled type. These capacitors, shaped like a block, are made with films supporting at least one metallization. They have two metal plates placed on two opposite lateral faces of the block. These plates are formed by at least two pads. One of the pads of each plate is used to apply a severe electrical treatment. These pads are obtained by making a notch in the plate or by masking during the metallization of the plate. The disclosure is applicable to film capacitors capable of undergoing a severe electrical treatment without loss of capacitance.

14 Claims, 4 Drawing Sheets (PRIOR ART)
FIG_1
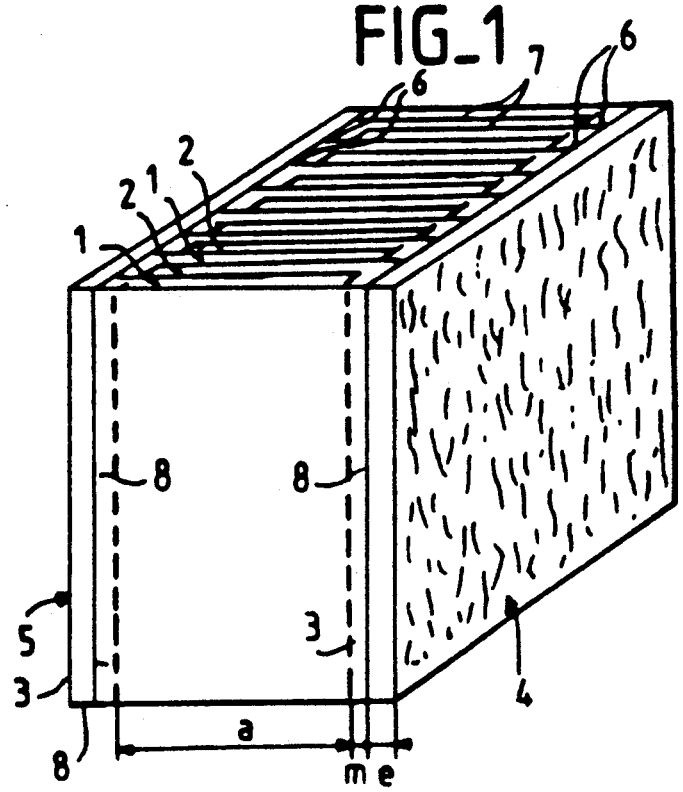
(PRIOR ART)
FIG_3
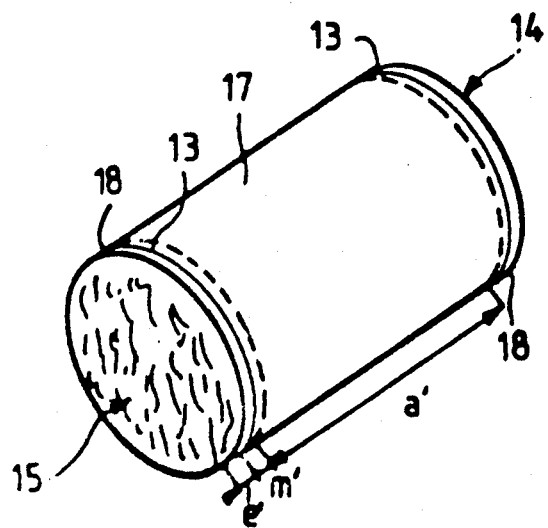

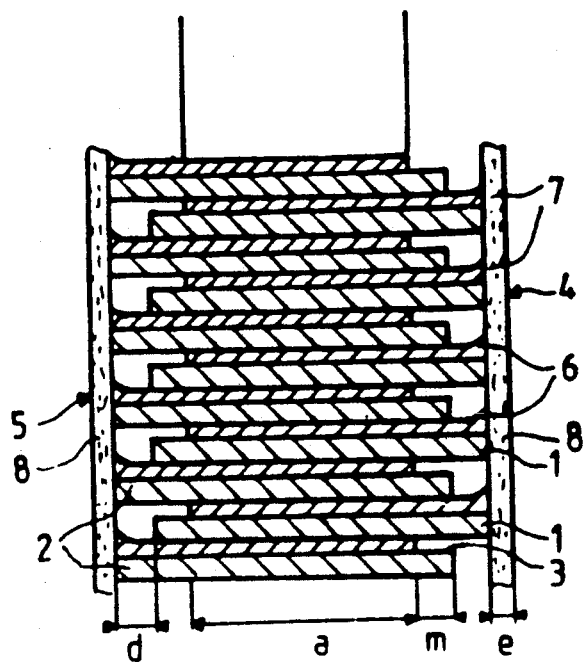
FIG_2 (PRIOR ART)
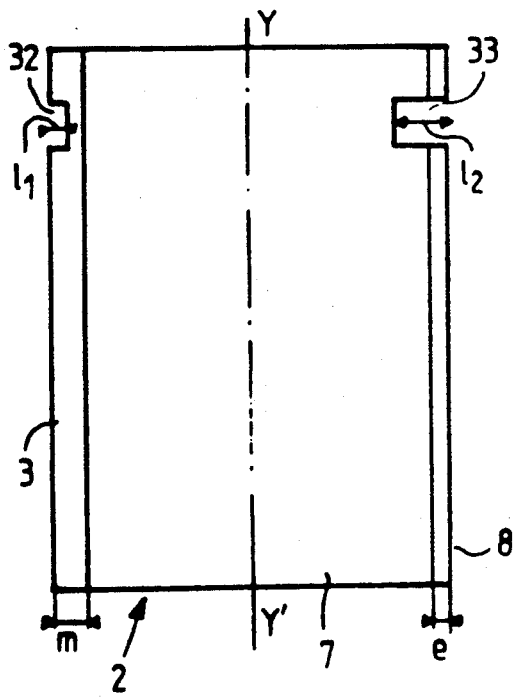
FIG_5-a
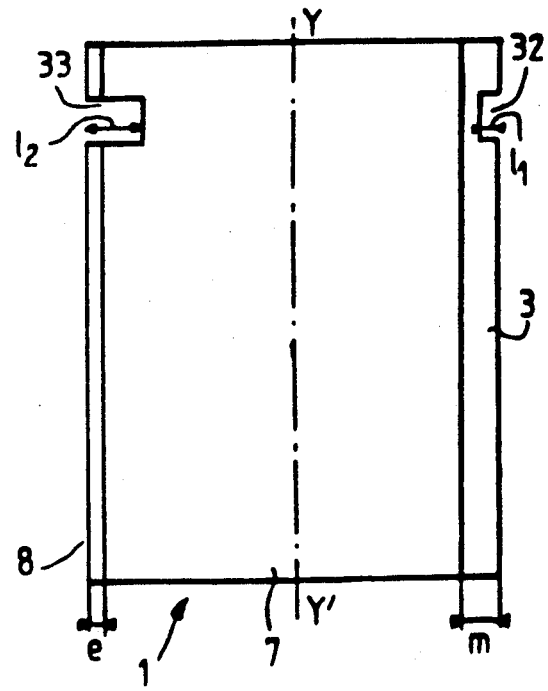
FIG_5-b

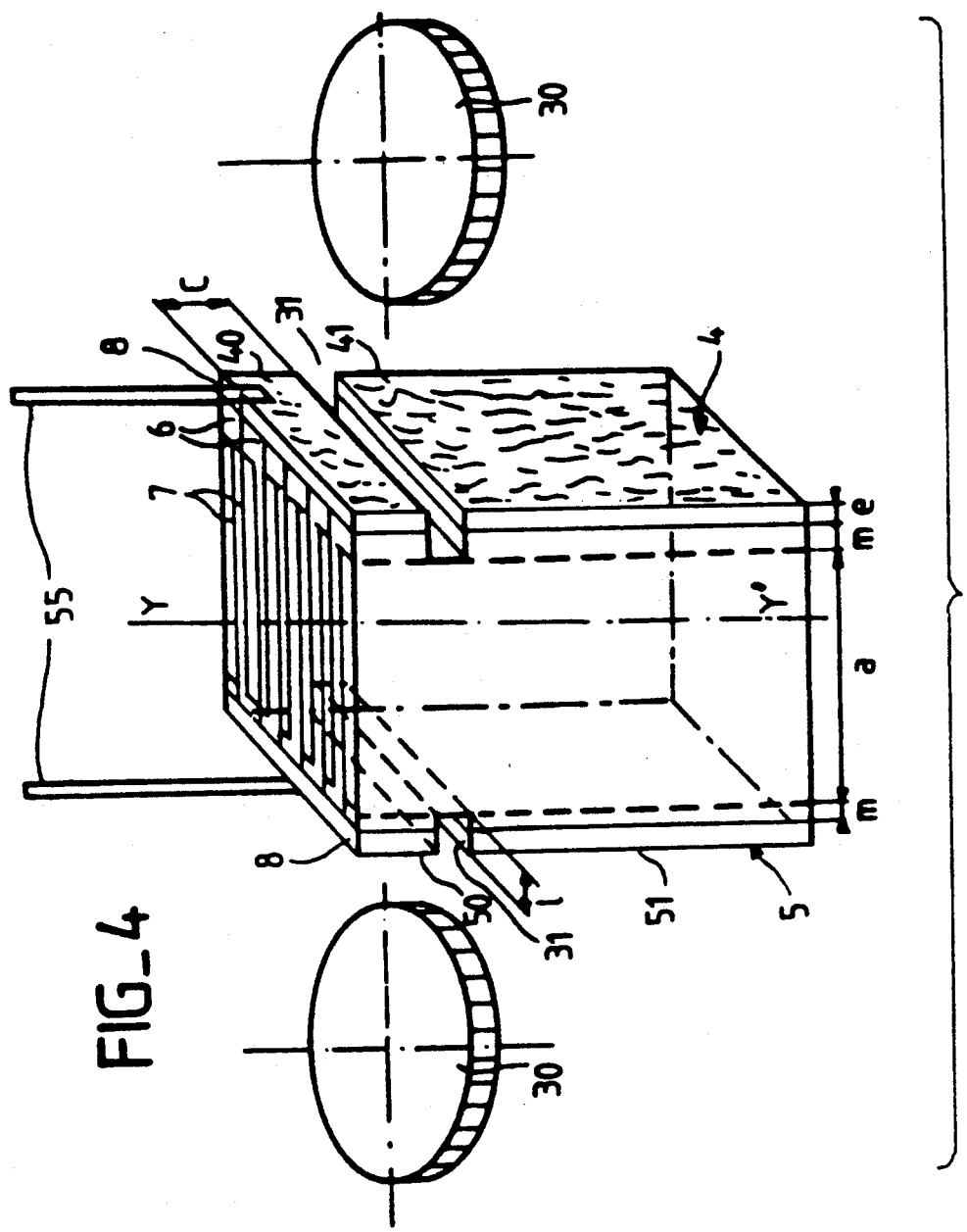
FIG_4

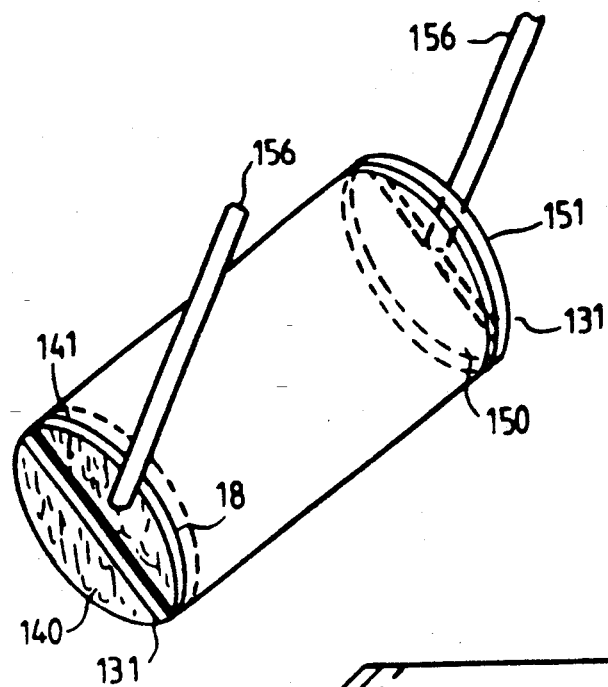
FIG_7
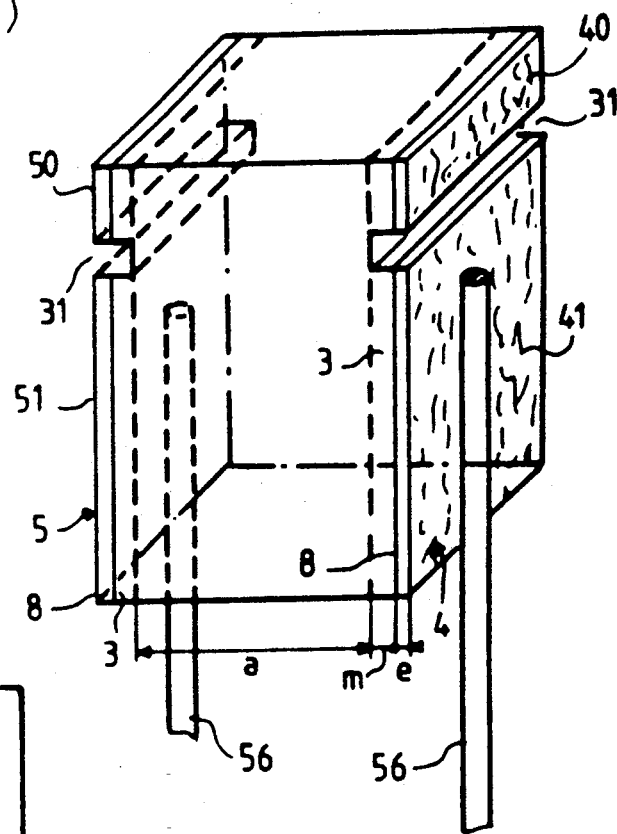
FIG_6
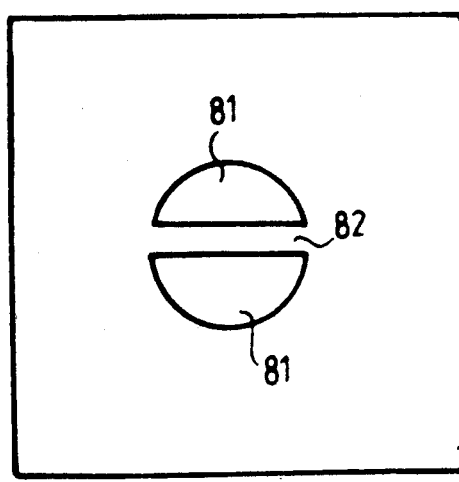
FIG_8

FILM CAPACITOR CAPABLE OF UNDERGOING SEVERE ELECTRICAL TREATMENT AND METHODS FOR THE FABRICATION OF SUCH A CAPACITOR

BACKGROUND OF THE INVENTION

1. Field of the Invention

The present invention concerns the fabrication of film capacitors. It pertains more particularly to the fabrication of stacked or coiled capacitors capable of undergoing severe electrical treatment without causing any loss in capacitance.

2. Description of the Prior Art

The fabrication of stacked capacitors using metallized plastic films is known. Generally, plastic films with a metallized zone and a non-metallized lateral margin are used. Two films are superimposed, with their non-metallized lateral margins on opposite sides, in order to obtain a pair of films formed by an odd-order film and an even-order film. At least one pair of metallized films is coiled on a large-diameter wheel in a number of determined turns. A capacitive strip with alternating even-order and odd-order layers, called a parent capacitor, is obtained. Each of the lateral faces of the capacitive strip is then coated with a metal in order to make plates. Each plate enables the metallizations of the layers having the same order to be electrically and mechanically connected together. This operation is known as schoop-plating. By cutting out the capacitive strip into blocks, distinct capacitors of a generally parallelepiped shape are obtained They are formed by a stacking of alternative even-order and odd-order sheets, held between two plates located on the opposite faces of the block.

Connection elements are then fixed to the plates of each capacitor.

Coiled capacitors, for their part, are generally fabricated individually. As above, at least one pair of metallized films is used, coiled on itself. At the end of a number of turns, a cylindrical unit is obtained. Metallic plates are deposited on the two lateral faces of the block by schoop plating. These faces are then circular. Then, a connection element is fixed to each of the plates.

The plastic films used are generally made of polyamide, polyester etc. Their thickness ranges from some micrometers to some tens of micrometers. During the metallization, defects may appear on the film: it may get pierced, dust may get attached to it, etc. A known way of getting rid of these defects is to make the finished capacitors undergo severe electrical treatment. It suffices to apply a high voltage to the connection elements. This treatment attacks all the defects in the film at the same time, by the phenomenon known as "self-healing" or "clearing". Through this phenomenon, high currents are induced on each defect, but these high currents also go through the plates and, in particular, the connection between a plate and a metallized zone of the film. When the current is too high, it can happen that the connection will act like a fuse and the capacitor then loses a part of its capacitance corresponding to the capacitive sheet touched by the fused connection The present invention seeks to overcome this drawback and enables the electrical treatment of film capacitors of the stacked or coiled type, in inducing very high currents which, in normal times, would have destroyed all their connections.

SUMMARY OF THE INVENTION

The invention proposes a film capacitor of the stacked or coiled type having the shape of a block, made with at least one film supporting at least one metallization and comprising two plates, with a thickness e electrically connecting the metallizations, wherein each plate is formed by at least two pads, one of the pads of each plate being used to apply the severe electrical treatment, with a view to the self-healing of the film.

The invention can be applied particularly to film capacitors, of the stacked or coiled type, made with film supporting a metallization and comprising at least one non-metallized lateral margin. The margins located on two successive layers are placed on two lateral faces of the capacitor.

The film used may comprise a metallization and a lateral margin on each face, the two margins of one and the same film being located on opposite sides.

The pads used to apply the severe electrical treatment may be facing each other.

The invention also proposes methods for the making of capacitors of this type. According to a first method, the pads are obtained by making at least one notch, with a cutting tool, throughout the thickness of metal of each of the plates. The depth of the notch is between the thickness of the metal of the plates and the active width of the capacitor. This operation takes place before the connection elements are fixed. This method can be used for both stacked and coiled capacitors.

According to another method, the pads are obtained during the metallization of the plates. To this end, a mask is used comprising hollows at the places where it is desired to deposit the metal and solid portions at the places that are not supposed to receive any metal. This method is preferably used for individually fabricated coiled capacitors.

BRIEF DESCRIPTION OF THE DRAWINGS

Other characteristics and advantages of the invention will emerge from the following description, given by way of a non-restrictive example and illustrated by the appended figures, of which:

FIG. 1 shows a semi-finished, stacked capacitor according to the prior art;

FIG. 2 shows a top view of the details of a stacked capacitor according to the prior art;

FIG. 3 shows a semi-finished coiled capacitor according to the prior art;

FIG. 4 shows a stacked capacitor according to the invention, under fabrication;

FIG. 5a shows a detailed view of an even-order sheet of a stacked capacitor made according to one of the methods of the invention;

FIG. 5b shows a detailed view of an odd-order sheet of a stacked capacitor made according to one of the methods of the invention;

FIG. 6 shows a finished, stacked capacitor fabricated according to one of the methods of the invention;

FIG. 7 shows a finished, coiled capacitor fabricated according to one of the methods of the invention;

FIG. 8 shows a mask used during the fabrication of the coiled capacitors, according to one of the methods of the invention;

In these figures, the same references are repeated for the same drawings.

DESCRIPTION OF PREFERRED EMBODIMENTS

FIG. 1 shows a semi-finished, stacked capacitor, obtained after a capacitive strip has been cut into parallelepiped-shaped blocks. This capacitive strip has been made by the prior art technique of coiling on a large-diameter wheel. The block shown is essentially formed by a stacking of an even number of sheets 1, 2. The material of the sheets is a plastic film. Each sheet 1, 2 shown has, on one of its faces, a metallized zone 7 and a side margin 3 with a non-metallized face m. The other face is not metallized. Stacked capacitors can also be fabricated with metallized films on both their faces. The sheets 1, 2 are stacked alternately, i.e. two successive sheets 1, 2 have their margin 3 on the opposite lateral faces of the block. The sheets 1 are said to be odd-order sheets and the sheets 2 even-order ones.

A metallic plate 8 has been deposited on each of the lateral faces 4, 5 of the block. This operation, known as schoop plating, takes place before the cutting of the capacitive strip. A metal layer, with a thickness e, is vacuum-sputtered on the lateral faces of the strip, on the margins side. These plates enable the electrical and mechanical connection of the metallized zones 7 of all the sheets 1, 2 of the same order. The references 6 indicate the connection between a metallized zone 7 and a plate 8.

The distance a is the active width of the capacitor. It corresponds to the facing part between two successive metallized zones 7.

In most cases, the stacked capacitors have a structure such as the one shown in FIG. 2. The coiling of the metallized films is done in such a way that two successive films are slightly offset laterally with respect to each other, by a distance d called an projecting feature. This projecting feature is of the order of some tens of millimeters. This capacitor structure facilitates the connection 6 between a metallized zone 7 and a plate 8 during the schoop plating It also prevents the risks of short-circuiting. In FIGS. 4 and 6, the stacked capacitor has no projecting feature. This is solely with a view to simplification and clarity. Two successive sheets could be offset.

FIG. 3 shows a semi-finished coiled capacitor. It has been obtained, according to a known technique, by coiling an even number of superimposed plastic films on themselves. A cylindrical block is obtained with its two lateral faces 14, 15 being circular. Each film has a metallized zone 17 and a lateral margin 13, with a width m' that is not metallized. The films used are superimposed alternately, that is, the two films have their margin 13 on two opposite, lateral faces 14, 15 of the block. Plates 18, with a thickness e', have been deposited on the lateral faces 14, 15 of the block. They have been deposited by schoop plating. The distance a' represents the active width of the capacitor. The plastic films have been coiled without lateral offset. There could be such films as described with reference to FIG. 2.

A connection element will be subsequently fixed to each of the plates 8 and 18 of the capacitors shown in FIG. 1, 2 and 3.

FIG. 4 shows a stacked capacitor as described in FIG. 1, under fabrication according to a first method in accordance with the invention. A cutting tool 30, such as a circular saw or a mill moving in a direction parallel to the plates 8, is used to make at least one notch 31 in each of the plates 8. Only one notch 31 per plate 8 is shown. Each notch 31 is designed to divide each plate 8 into two juxtaposed pads 40, 41 and 50, 51. Each notch 31 is, for example, perpendicular to the sheets 1, 2 and crosses each plate 8 from one side to the other. Each notch 31, having a depth 1, penetrates the entire thickness e of the plate 8. It can project beyond the margin 3 of a width m without, however, penetrating the active width a to avoid reducing the capacitance of the capacitor. The two notched plates 8 are preferably identical. Two notches 31, each placed on a plate 8, are symmetrical with respect to an axis YY' parallel to the sheets 1, 2. They have the same depth 1.

In order to make these notches 31 symmetrically, it is enough to position the block and then simultaneously cut into each of the plates 8 by means of a tool 30. It is then possible to apply two contact electrodes 55 to two pads 40, 50, each located on plate 8, preferably facing each other. These contact electrodes 55 enable the electrical treatment of the capacitor. If this electrical treatment is very severe, it can of course, by fuse effect, damage certain connections 6 between the metallized zones 7 and the plates 8. However, these connections are damaged only over a distance c. This distance c corresponds to the height of the pads 40, 50 undergoing the severe electrical treatment. By this treatment, no connection 6 or no sheet 1, 2 will be entirely damaged.

This distance c may be managed automatically so a to determine, for each instant, a maximum current which should not be exceeded so as not to melt the connection 6.

After this severe electrical treatment, the contact electrodes 55 are withdrawn and a connection element can be fixed to each of the other two pads 41, 51 which have not undergone the electrical treatment. This element is not shown in FIG. 4.

FIG. 5a shows a detailed frontal view of an even-order sheet 2 of a stacked capacitor according to the invention. Two successive sheets are mutually offset as shown in FIG. 2. The sheet 2 shown has, on its visible face, a metallized zone 7 and a non-metallized lateral margin. A layer of metal with a thickness e borders the side opposite to the margin 3. This layer forms part of a plate 8 made by schoop plating. This plate 8 part is found only one side because of the offset between the sheets. This sheet 2 also has two notches 32, 33 located so as to face each other. One of them, 32, is located in the margin 3. The other, 33, penetrates the metal of the plate 8.

These notches 32, 33 have a different depth because of the offset. The notch 32, placed in the margin 3, will have a depth $l_1$ such that:

$$l_1 = x \text{ with } x \text{ smaller than or equal to } m$$

The notch 33, placed on the side opposite the margin 3 will have a depth $l_2$ such that:

$$l_2 = x + d + e$$

FIG. 5b represents an odd-order sheet 1. This sheet 1 is comparable to the even-order sheet 2, it is only symmetrical with respect to the axis YY'. The notch 32 placed in the margin 3 has a depth $l_1$ such that:

$$l_1 = x \text{ with } x \text{ smaller than or equal to } m.$$

The notch 33 placed on the side opposite to the margin 3 will have a depth $l_2$ such that:

$l_2 = x + d + e$

FIG. 6 shows the finished stacked capacitor according to the invention. The contact electrodes have been withdrawn from the pads 40 and 50. A connection element has been fixed to each of the pads 41, 51 that have not undergone the severe electrical treatment. These connection elements 56 are preferably parallel to the two lateral faces 4 and 5. One or more coating operations may subsequently come into play.

FIG. 7 shows a finished, coiled capacitor according to the invention. Two pads 140, 141 and 150, 151 have been made in each of the plates 18 of the capacitor. It was possible to obtain these pads by the above-described method, that is, by using a tool to make at least one notch 131 in each of the plates 18. The notch 131 shown extends along a diameter of the plate 18. In this figure, no projecting feature is shown, with a view to simplification.

As previously, the notch 131 penetrates the entire thickness $e'$ of the plate 18, but it can project into the margin 3, without however penetrating the active width $a'$ (see also FIG. 3). As described previously, a severe electrical treatment is applied to a pad 140, 150 of each plate 18, these two pads 140, 150 preferably facing each other. This treatment is applied by means of pads that are not shown. For, they are withdrawn at the end of the treatment. A connection element 156 is then fixed to two pads 141, 151, each located on a plate 8, preferably facing each other. These pads 141, 151 were not disturbed by the current of the severe electrical treatment. These connection elements 156 are preferably parallel to the plates 18.

A second method of fabrication may be used to make a capacitor according to the invention.

It can be applied more particularly to a coiled capacitor. Since the coiled capacitors are fabricated individually, the pads 140, 141, 150, 151 can be made directly during the schoop plating for the deposition of the plates 18. Since this operation is done by sputtering of metal under vacuum, it is enough to have a mask before each of lateral faces of the coiled block. A mask 80 such as this is shown in FIG. 8.

It has hollows 81 corresponding to the zones to be metallized and solid parts 82 corresponding to the zones where no metallization is desired. The shape of the hollows will be that of the pads and the shape of the solid parts 82 will be that of the notches. During the fabrication, the coiled block will be preferably positioned between two identical masks 80, so that the plates are identical on both lateral faces of the block.

The examples describe apply to techniques currently employed in the capacitor industry. The invention can be applied, without any difficulty for those skilled in the art, to other techniques for the fabrication of coiled or stacked capacitors. A single metallized film could be used. The film could be metallized on both its faces. It may be without a margin, etc.

We claim:

1. A film capacitor of the stacked or coiled type having the shape of a block, with successive layers made with at least one film supporting at least one metallization and comprising two plates, with a thickness e electrically connecting the metallizations, wherein each plate is formed by at least two pads, one of the pads of each plate being used to apply a severe electrical treatment, with a view to the self-healing of the film.

2. A film capacitor according to claim 1, wherein the film supporting the metallization comprises a non-metallized lateral margin, the margins of two successive layers being placed on two opposite lateral faces of the bock, the two faces being each clad with a plate.

3. A film capacitor according to claim 2, comprising the at least two pads of each plate formed by making a notch in each plate, each notch extending through the entire thickness e of each plate and into at least a portion of the adjacent non-metallized lateral margins.

4. A film capacitor according to claim 3, comprising said successive layers being offset such that every other layer is mutually aligned, and respective extents of said notches into said opposing lateral margins of each layer being of different depth.

5. A film capacitor according to claim 4, comprising:
   the width of said lateral margin adjacent an edge of said layer not contacting one of said plates being defined as m;
   the distance of said edge of said layer from an adjacent of said plates being defined as d; and
   said notches in each plate having a depth less than $e + d + m$.

6. A film capacitor according to claim 1, wherein the film supports a metallization on each face and has a non-metallized lateral margin on each of opposite sides of each face.

7. A film capacitor according to one of the claims 1 to 6, wherein the pads used to apply the severe electrical treatment face each other.

8. A method for the fabrication of a film capacitor of the stacked or coiled type having the shape of a block, with successive layers made with at least one film supporting at least one metallization and comprising two plates, with a thickness e electrically connecting the metallizations, comprising the steps of:
   (a) coiling the film,
   (b) depositing the plate by schoop plating,
   (c) cutting out into distinct blocks,
   (d) making at least one notch in each plate so as to obtain at least two pads on each plate,
   (e) applying a severe electrical treatment to two pads, each located on a different plate, and
   (f) fixing connection elements to two pads that have not undergone the severe electrical treatment, these pads being each located on a different plate.

9. A method for the fabrication of film capacitors according to claim 8, wherein the notch penetrates the entire thickness e of the plate without cutting into an active width of the capacitor.

10. A method for the fabrication of a film capacitor according to one of the claims 8 or 9, comprising notching the two plates identically.

11. A method for the fabrication of a film capacitor according to claim 9, comprising simultaneously making the notches in the two plates.

12. A method for the fabrication of a film capacitor of the stacked or coiled type having the shape of a block, with successive layers made with at least one film supporting at least one metallization and comprising two plates, with a thickness e electrically connecting the metallizations, comprising the step of coiling the film, said method subsequently comprising the steps of:
   (a) depositing the plates by schoopplating thorough a mask having at least one solid part and hollowed parts so as to make pads,
   (b) applying a severe electrical treatment to two pads, each located on a different plate, (c) fixing of connection elements to two pads, each located on a different plate.

13. A method for the fabrication of a film capacitor according to claim 12, wherein the two plates deposited by schoop plating are identical.

14. A method for the fabrication of a film capacitor according to one of the claims 12 or 13, comprising depositing the two plates by schoop plating using two identical masks.

* * * * *